May 5, 1936.  A. NAGEL  2,039,737
PHOTOGRAPHIC CAMERA
Filed Dec. 28, 1934
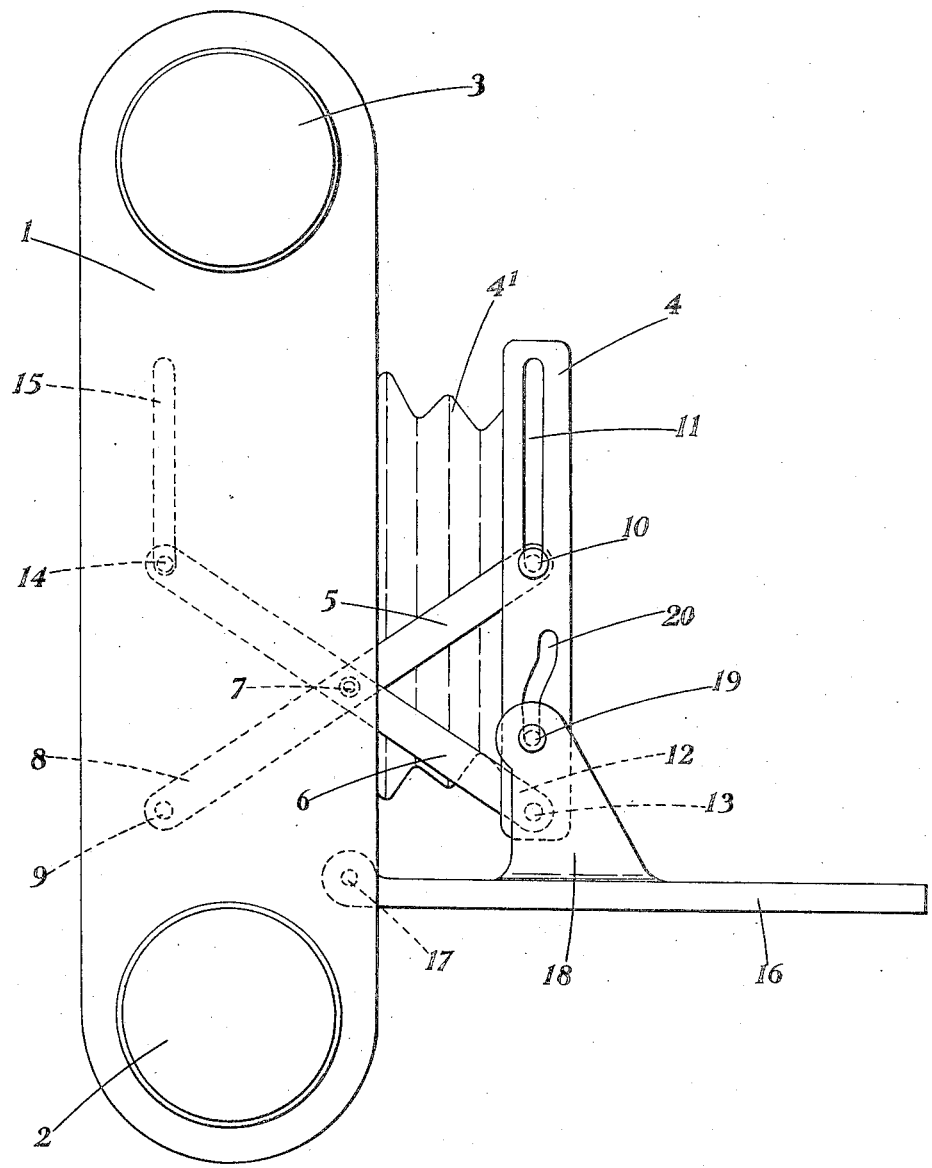
INVENTOR
August Nagel,
BY
ATTORNEYS.

Patented May 5, 1936

2,039,737

UNITED STATES PATENT OFFICE 2,039,737

PHOTOGRAPHIC CAMERA

August Nagel, Stuttgart-Nord, Germany, assignor to Eastman Kodak Company, Rochester, N. Y., a corporation of New York Application December 28, 1934, Serial No. 759,522
In Germany January 16, 1934

13 Claims. (Cl. 95—40)

This invention relates to photographic cameras of the kind in which a panel carrying the lens and shutter is connected by a lazy tongs link mechanism to the camera body so that the panel, while being moved into and out of the camera body, is maintained approximately parallel to the focal plane, a door being hinged to the camera body so that in the open position it serves as a baseboard for the panel when this is withdrawn from the camera body.

In a photographic camera according to the invention an operative connection is provided between the door and the panel so that the latter is moved when the door is turned. Thus, the panel may be furnished with a guide or slot within which can slide an actuating pin or projection carried by the baseboard so that when this is rotated about its hinge the panel will be moved relatively to the camera body while it is maintained parallel to the focal plane.

The lazy tongs link mechanism may be connected to the panel by two pivots spaced apart, and relatively movable, in a direction parallel to the central plane of the panel, the guide or slot engaged by the actuating pin or projection being disposed between the said pivots. Conveniently when the door or baseboard is moved into its fully open position, the actuating pin engages one end of the slot in the panel and the link mechanism is in the limiting position of its outward movement. The panel is thus firmly held in its correct position.

Conveniently the guide or slot is so formed that for any given angular rotation of the baseboard the resulting movement transmitted to the panel decreases as the panel approaches the end of its outward travel, and the return movement of the panel from such outermost end position is facilitated. For example, one or each end of the guide or slot may be substantially parallel to the central plane of the panel whilst the other or the central portion of the guide or slot is inclined to such plane. In this way for any given angular rotation of the baseboard the resulting movement transmitted to the panel decreases as the actuating pin approaches one or each end of the slot.

One construction according to the invention is illustrated diagrammatically and by way of example in the accompanying drawing. In the construction illustrated the camera, which is of the roll film type, comprises a body 1 furnished with a supply spool 2 and a take-up spool 3 between which the film extends over an exposure frame. A lens panel 4 connected to the camera body by a light-tight bellows 4' is connected by a lazy tongs link mechanism to the camera body. The lazy tongs mechanism comprises two pairs of links 5 and 6 pivoted together at 7, one pair of links being arranged on each side of the panel. The end 8 of the link 5 in each pair is connected to a fixed pivot 9 within the camera casing whilst the opposite end of this link is furnished with a pivot 10 which can slide along a slot 11 formed in the side of the lens panel or in a part carried thereby. The end 12 of the link 6 is connected by a fixed pivot 13 to the lens panel 4 whilst the opposite end of this link is furnished with a pivot pin 14 which can slide along a slot 15 within the camera casing. The lens panel 4 can thus move into or out of the body 1 but will at all times be maintained with its central plane parallel to the focal plane, the pivots 9 and 14, and 13 and 10, moving relatively to each other in a direction parallel to this plane.

A door 16 is hinged to the camera body at 17 and is furnished with two arms or brackets 18 which lie on opposite sides respectively of the lens panel 4. Each arm 18 is furnished with an actuating pin 19 which engages and can slide along a slot 20 formed in the side of the panel 4 or in a part carried thereby. Each slot 20 is so formed that whilst each of its ends is substantially parallel to the central plane of the lens panel 4 the central part of the slot is inclined to this plane. In addition the slots 11, 15 and 20 are so dimensioned that when the lens panel has been fully withdrawn from the camera as shown, the pivots 10 and 14 are in engagement with the lower ends of the associated slots 11 and 15 whilst the actuating pin 19 is in engagement with the lower end of the slot 20.

Assuming now that the parts are in the position shown in the drawing and it is desired to close the camera, this can be done by merely rotating the door 16 about its hinge 17. During the early part of this rotation the resulting movement transmitted to the lens panel 4 is small since the lower end portion of the slot 20 is parallel to the central plane of the panel 4. The commencement of the closing operation is thus facilitated but as soon as the actuating pin 19 engages the inclined portion of the slot 20 the movement of the lens panel 4 is accelerated until the actuating pin 19 arrives within the parallel portion at the upper end of the slot 20 when the lens panel 4 is again decelerated. In addition to facilitating the commencement of the folding operation the strain on the hinge 17 of the door 16 is reduced.

In order to open the camera ready for use, the door 16 is turned outwards about its hinge 17 the actuating pin 19 first sliding along the parallel portion at the upper end of the slot 20 so that the commencement of the opening movement is facilitated. The actuating pin 19 then engages the inclined portion of the slot 20 and the outward movement of the lens panel 4 is accelerated until the actuating pin 19 arrives in the lower parallel portion of the slot 20 when the outward movement of the panel 4 is decelerated. When the door 16 is fully open the pivot pins 10 and 13 and the actuating pin 19 lie in direct alignment and the correct relative positions of the lens panel 4 and door 16 which then acts as a baseboard, is securely maintained.

It will therefore be seen that in a camera according to the invention the means for moving the lens panel simultaneously serves firmly to maintain the correct relative positions of the door and lens panel.

It will be understood that the construction above described is given by way of example only and that details may be modified.

What I claim as my invention and desire to secure by Letters Patent is:—

1. In a photographic camera, in combination, a casing, a lens panel, lazy tongs link mechanism connected at one end by two pivots to the camera casing and at the other end by two pivots to the panel, the two pivots at each end being spaced apart, and relatively movable, in a direction parallel to the focal plane so that the link mechanism, whilst maintaining the panel with its central plane parallel to the focal plane, permits movement of the panel into its inoperative position within the casing and into its operative position outside the casing, a door hinged to the camera casing, said door when fully closed covering the lens panel within the casing and when fully open serving as a baseboard for the panel when the latter is in its operative position, and a projection carried by the door and engaging a guide slot formed in the panel between the two pivots of the link mechanism, whereby when the door is turned about its hinge movement is transmitted to the panel by the said projection which slides along the guide in the panel.

2. In a photographic camera, the combination with a casing, a lens panel, a lazy tongs linkage between said casing and said lens panel, a pair of pivotal connections between said linkage and said casing, a pair of pivotal connections between said linkage and said lens panel, one connection of each pair being movable in parallel planes, and a door connected to said casing, movable to a closed position for enclosing said casing and movable to an open position to form a support for said lens panel, of an operating connection between said door and said lens panel and for moving said lens panel upon movement of said door.

3. In a photographic camera, the combination with a casing, a lens panel, a lazy tongs linkage between said casing and said lens panel, a pair of pivotal connections between said linkage and said casing, a pair of pivotal connections between said linkage and said lens panel, one connection of each pair being movable in parallel planes, and a door connected to said casing, movable to a closed position for enclosing said casing and movable to an open position to form a support for said lens panel, of a projection fixed to said door for slidably engaging said lens panel and moving said lens panel when said door is moved to open and closed positions.

4. In a photographic camera, the combination with a casing, a lens panel, a lazy tongs linkage between said casing and said lens panel, connections between said linkage and said casing and between said linkage and said lens panel for maintaining said lens panel in parallel relation to said casing during movement with respect thereto, and a door connected to said casing movable to a closed position to enclose said casing and movable to an open position to form a support for said lens panel, of a guideway upon said lens panel, and a projection fixed to said door for engaging said guideway and moving said lens panel with respect to said casing when said door is moved to open and closed positions.

5. In a photographic camera, the combination with a casing, a lens panel, a lazy tongs linkage between said casing and said lens panel, a pair of pivotal connections between said linkage and said casing, a pair of spaced pivotal connections between said linkage and said lens panel, one connection of each pair being movable in parallel planes, and a door connected to said casing movable to a closed position for enclosing said casing and movable to an open position to form a support for said lens panel, of a guideway on said lens panel and located between the pair of pivotal connections thereto, and a projection fixed to said door for slidably engaging said guideway and moving said lens panel with respect to said casing when said door is moved to open and closed positions.

6. In a photographic camera, the combination with a casing, a lens panel provided with a guide slot, a lazy tongs linkage between said casing and said lens panel, a pair of pivotal connections between said linkage and said casing, a pair of pivotal connections between said linkage and said lens panel, one connection of each pair being movable along parallel lines, and a door hinged to said casing, movable to a closed position for enclosing said casing and movable to an open position to form a support for said lens panel, of a projection carried by said door and engaging said guide slot in the lens panel, for moving the lens panel when the door opened and closed and abutting one end of said guide slot when said door is fully opened.

7. In a photographic camera, the combination with a casing, a lens panel, connections between said casing and said panel for operatively connecting said panel to said casing for relative movement in parallel relation to each other, and a door connected to said casing and movable to a closed position and to an open position, of an actuating connection between said door and said lens panel and including cooperating parts for producing a mechanical advantage which is varied by movement of said door and which is at a minimum as the door approaches either of said positions.

8. In a photographic camera, the combination with a casing, a lens panel, connections between said casing and said panel for operatively connecting said panel to said casing for relative movement in parallel relation to each other, and a door connected to said casing and movable to a closed position and to an open position, of an actuating connection between said door and said lens panel and including cooperating parts for producing a mechanical advantage which is varied by movement of said door and which increases to a maximum during movement of said door from one position to the other position.

9. In a photographic camera, the combination with a casing, a lens panel, connections between said casing and said panel for operatively connecting said panel to said casing for relative movement in parallel relation to each other, and a door connected to said casing and movable to a closed position and to an open position, of an actuating connection between said door and said lens panel and including cooperating parts for producing a mechanical advantage which is varied by movement of said door and which increases to a maximum and decreases to a minimum during movement of said door from one position to the other position.

10. In a photographic camera, the combination with a casing, a lens panel, connections between said casing and said panel for operatively connecting said panel to said casing for relative movement in parallel relation to each other, and a door connected to said casing and movable to a closed position and to an open position, of an actuating connection between said door and said lens panel and including a projection on said door and a guideway which is on said panel and which has an inclined portion engaged by said projection and for producing a maximum mechanical advantage upon movement of said door from one position to the other position.

11. In a photographic camera, the combination with a casing, a lens panel, connections between said casing and said panel for operatively connecting said panel to said casing for relative movement in parallel relation to each other, and a door connected to said casing and movable to a closed position and to an open position, of an actuating connection between said door and said lens panel and including a projection on said door and a guideway which is on said lens panel and which has parallel end portions which are engaged by said projection and for producing only a minimum mechanical advantage as the door approaches either of said positions.

12. In a photographic camera, the combination with a casing, a lens panel provided with a guide slot which has an intermediate inclined portion, connections between said casing and said panel for operatively connecting said panel to said casing for relative movement in parallel relation to each other, and a door connected to said casing and movable to a closed position and to an open position, of a projection on said door for engaging said guide slot in the lens panel and for actuating said lens panel with an increasing mechanical advantage upon movement of said door from one position to the other position.

13. In a photographic camera, the combination with a casing, a lens panel provided with a guide slot which has parallel displaced end portions and an intermediate inclined portion, connections between said casing and said panel for operatively connecting said panel to said casing for relative movement in parallel relation to each other, and a door connected to said casing and movable to a closed position and to an open position, of a projection on said door for engaging said guide slot in the lens panel and for actuating said lens panel with an increasing mechanical advantage upon movement of said door from one position to the other position and with a minimum mechanical advantage as the door approaches either of said positions.

AUGUST NAGEL.